C. PONTEZ.
Excavator.

No. 207,064.      Patented Aug. 13, 1878.

WITNESSES
M. J. Utley.
F. J. Mabi.

INVENTOR
Charles Pontez,
by E. W. Anderson
ATTORNEY

UNITED STATES PATENT OFFICE.

CHARLES PONTEZ, OF OMAHA, NEBRASKA.

IMPROVEMENT IN EXCAVATORS.

Specification forming part of Letters Patent No. 207,064, dated August 13, 1878; application filed November 17, 1877.

*To all whom it may concern:*

Be it known that I, CHARLES PONTEZ, of the city of Omaha, in the county of Douglas and State of Nebraska, have invented a new and valuable Improvement in Excavator and Dredging; and I do hereby declare that the following is a full, clear, and exact description of the construction and operation of the same, reference being had to the annexed drawings, making a part of this specification, and to the letters and figures of reference marked thereon.

Figure 1:
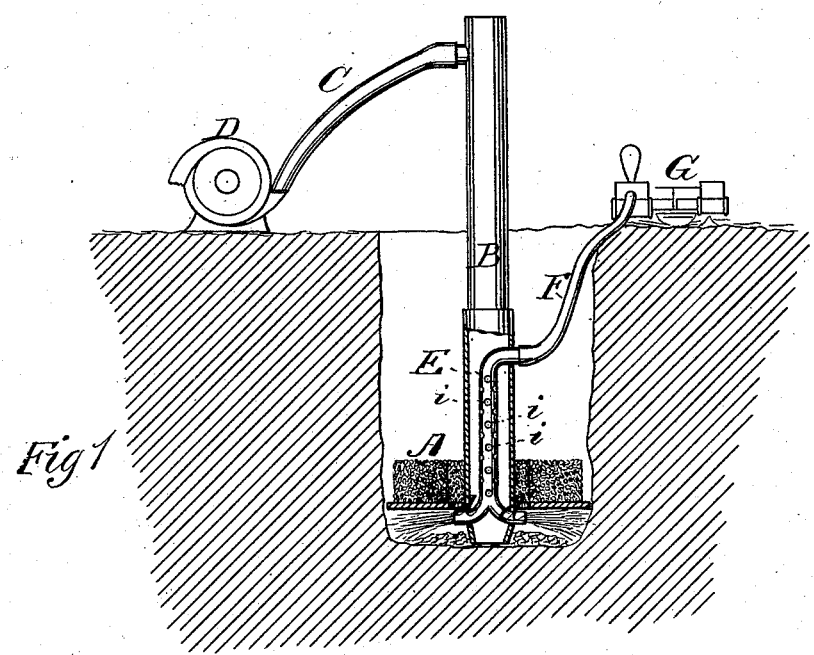
Figure 2:
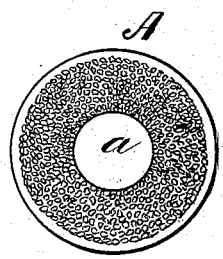
Figure 3:
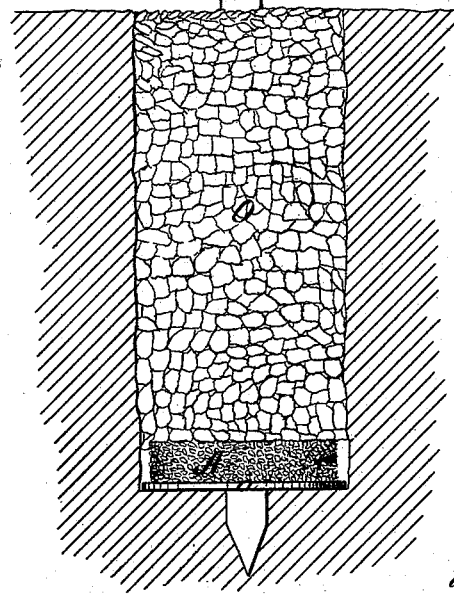

Figure 1 of the drawings is a representation of a side view of my improved excavator and dredge. Fig. 2 is a top view of the disk, and Fig. 3 is a view of a pile anchored.

This invention has relation to improvements in devices for making vertical excavations or shafts on the land or under water for the purpose of deeply and solidly anchoring piles, and for other purposes; and it consists in a disk of suitable weight, having a central opening through it, which is placed over the spot to be excavated, in combination with means substantially as described, whereby the material under the disk is disintegrated and removed, and the said disk sinks into the space thus made, forming a pit or well as it descends.

In the annexed drawings, the letter A indicates a disk of metal, stone, or wood, suitably loaded, having a central orifice, a. B represents the excavating-cylinder, formed of a number of sections removably jointed together. This cylinder is open at its lower end, and closed at its upper end, near which it is connected by means of a preferably flexible pipe, C, with a suction-engine, D. Within the lower section is an upright metallic pipe, E, that extends at its upper end through the cylinder-wall, and terminates in branched jets d d', extending in opposite directions. The pipe E within the cylinder is provided with spaced perforations i, and its upper end is connected by a pipe, F, with a forcing-engine, G.

It being required to sink an excavation in sand or in alluvial soil saturated with water, the disk is placed in position, and the excavating-cylinder passed through its central orifice a, with its lower end resting against the ground. The suction-pump is then started, thereby producing a partial vacuum within the cylinder, which causes the said cylinder to be forced into the ground by atmospheric pressure, and soil to enter its lower end. Simultaneously water from the forcing-pump is sent through the pipe E, and emerges in opposite jets from the branches d d', thereby disintegrating the soil under the disk and allowing it to enter the cylinder. Here it encounters the jets of water from perforations i, and is reduced to a semi-fluid mass, and is prevented from packing in its upward passage to the suction-engine, whence it is discharged into a suitable receptacle. As the earth is removed the disk sinks, and leaves a well or shaft above it. This shaft being sufficiently deep, the cylinder is removed, and a pile, N, passed through the orifice of the disk. The excavation is then filled with solid matter O, and the pile solidly anchored.

By the use of the devices above set forth, most of the external water is excluded from the disk, and no greater amount of water is forced under the same than is required to move the soil.

The use of the disk as a means of reaching a solid foundation is very effective and economical, there being no lateral friction, nor expensive material employed. This disk when made of wood is loaded, so that it will sink automatically as it is undermined.

What I claim as new, and desire to secure by Letters Patent, is—

The combination, with the gravitating disk A, having orifice a, of the excavating-cylinder B, having an interior branched perforated pipe, E, a force-pump connected with said pipe, and a suction-pump connected with said cylinder, substantially as specified.

In testimony that I claim the above I have hereunto subscribed my name in the presence of two witnesses.

CHARLES PONTEZ.

Witnesses:
C. BOWMAN,
G. STEVENSON.